United States Patent [19]

Grabowski

[11] Patent Number: 4,650,220
[45] Date of Patent: Mar. 17, 1987

[54] BYPASS CONNECTIONS OBTAINED BY MOLDING A COATING OF A JUNCTION MATERIAL AROUND A RIGID TUBULAR INSERT AND A PROCESS FOR MANUFACTURING SAME

[75] Inventor: Jean Grabowski, Chalette, France

[73] Assignee: Hutchinson, Paris, France

[21] Appl. No.: 608,209

[22] Filed: May 8, 1984

[30] Foreign Application Priority Data

Jul. 13, 1983 [FR] France .................. 83 11695

[51] Int. Cl.⁴ .............................. F16L 13/10
[52] U.S. Cl. ..................... 285/21; 285/284;
    285/156; 285/915; 285/188; 285/200; 264/36;
    264/263; 156/294
[58] Field of Search ............... 285/21, 152, 284, 156,
    285/158, 189, 200, 260, 239–241, 222, 188, 68,
    DIG. 16, 150; 156/294; 29/157.3 C, 235,
    402.18; 264/36, 263; 403/177, 244, 242, 194

[56] References Cited

U.S. PATENT DOCUMENTS

| 3,129,020 | 4/1964 | Bujnowski | 285/189 |
| 3,232,645 | 2/1966 | Bucks | 285/156 |
| 3,583,478 | 7/1968 | Fieni | 285/158 |
| 4,018,459 | 4/1977 | Mominee et al. | 285/39 |
| 4,076,282 | 2/1978 | Scott | 285/156 |
| 4,530,525 | 7/1985 | Schneider | 285/39 |

FOREIGN PATENT DOCUMENTS

| 164658 | 1/1954 | Australia | 285/423 |
| 2443824 | 12/1980 | Fed. Rep. of Germany . | |
| 2934098 | 3/1981 | Fed. Rep. of Germany | 285/156 |
| 3151640 | 7/1983 | Fed. Rep. of Germany | 264/263 |
| 3303519 | 8/1984 | Fed. Rep. of Germany | 264/263 |
| 2291441 | 6/1976 | France . | |
| 2393222 | 12/1978 | France . | |
| 2518699 | 6/1983 | France | 285/197 |
| 329214 | 8/1936 | Italy | 285/189 |
| 41817 | 4/1978 | Japan | 285/189 |
| 1562184 | 3/1980 | United Kingdom | 285/222 |
| 2033519 | 5/1980 | United Kingdom | 285/260 |
| 2038437 | 7/1980 | United Kingdom | 285/189 |

Primary Examiner—Cornelius J. Husar
Assistant Examiner—Eric K. Nicholson
Attorney, Agent, or Firm—Oblon, Fisher, Spivak, McClelland & Maier

[57] ABSTRACT

A bypass connection for flexible tubes, obtained by molding a coating of a junction material about a rigid tubular insert, and a process for manufacturing the connections. In these bypass connections, the insert includes at one end a first bell mouthed flange intended to be applied against the internal surface of a boss, provided with a flange which is also bell mouthed, of a main pipe, in combination with a second flange and the insert is formed by the secondary core for supporting a member to be connected to the main pipe, so that it forms an integral part of the bypass connection.

7 Claims, 3 Drawing Figures

BYPASS CONNECTIONS OBTAINED BY MOLDING A COATING OF A JUNCTION MATERIAL AROUND A RIGID TUBULAR INSERT AND A PROCESS FOR MANUFACTURING SAME

BACKGROUND OF THE INVENTION

1. Field of the Invention

The present invention relates to improvements to bypass connections for flexible (i.e. elastic) pipes, reinforced or not, sheathed or not, obtained by molding a coating of junction material, such as rubber, more particularly about a rigid tubular insert, and a process for manufacturing these connections.

2. Description of the Prior Art

Bypass connections obtained by molding a coating of junction material are already known in two different cases:

in the case of a bypass connection between a main pipe and a secondary pipe, itself also flexible, reinforced or not, sheathed or not, in which the junction material is molded about end zones of the main and secondary pipes which overlap mutually, while leaving an access to the pipe-pass orifice, and in the case of a bypass drain connection, in which the junction material is molded, at least in part, about a threaded or tapped rigid tubular insert intended to receive a plug or a drain screw, respectively, and around the bypass orifice of the main pipe.

In the first case, the mold which provides the outer shape to the coating of junction material is formed by two shells, whereas in the second case the mold is made in one piece.

The mold contains:

a main rigid core for supporting the main pipe, in both cases, and a rigid secondary core for supporting the secondary pipe, in the first case, or for supporting said threaded or tapped insert intended to receive said plug or said drain screw, in the second case.

Now, positioning and removing the secondary core is a difficult and costly operation, and becomes impracticable in the case of a bypass connection between two main pipes, close and parallel to each other, namely in the case of a "bridging".

SUMMARY OF THE INVENTION

The aim therefore of the present invention is to provide junction connections for flexible pipes obtained by molding a junction material, such as rubber, more particularly about an insert, which answer better the requirements of practice than connections known heretofore relating to the same aim, more especially in that:

they are connections with inner and/or outer reinforcement, they are more reliable than the connections of the prior art insofar as sealing is concerned, and their life span is improved.

Another aim of the present invention is to provide a process for manufacturing bypass connections for flexible pipes formed by molding a junction material, such as rubber, which better answers the requirements of practice than the processes already known relating to the same aim, more especially in that:

the expensive operation of removing the secondary core is eliminated, and the "bridging" between two closely situated and parallel main pipes is also made possible.

The present invention provides a bypass connection for flexible pipes, reinforced or not, sheathed or not, of the type comprising a tubular rigid insert coated at least partially with a junction material, such as rubber, by means of a mold comprising a main core supporting a main flexible pipe, having a boss with a bell mouthed flange on the periphery of a bypass orifice formed at the chosen position and a rigid secondary core supporting a member to be connected to said main pipe, which bypass connection is characterized in that the insert comprises at one end a first bell mouthed flange, intended to be applied against the internal surface of said boss, having a flange also bell mouthed, of the main pipe, in combination with a second flange, and in that the insert is formed by said secondary core for supporting said member to be connected to the main pipe, so that it forms an integral part of the bypass connection.

In an advantageous embodiment of the connection according to the invention, in the case where the member to be connected to the main pipe is formed by a secondary pipe, itself also flexible, reinforced or not, sheathed or not, the second flange of the insert is an annular flange for positioning this secondary pipe provided on the outer surface thereof, in an appropriate intermediate position.

In another advantageous embodiment of the bypass connection of the invention, in the case where the member to be connected to the main pipe is formed by a flexible secondary pipe, the insert cooperates with a finger for centering the latter with respect to the main pipe.

In yet another advantageous embodiment of the bypass connection of the invention, in the case where the member to be connected to the main flexible pipe is formed by a secondary flexible pipe, the other end of the insert is provided with notches which prevent the secondary pipe being pulled off.

In another advantageous embodiment of the bypass connection of the invention, in the case where the member to be connected to the main flexible pipe is formed by a secondary flexible pipe, the junction material molded around the main and secondary pipes of the insert has the shape of a T, whose transverse segment completely envelopes the corresponding portion of the main pipe, whereas the longitudinal segment of the T completely envelopes the corresponding portion of the secondary pipe, as well as the part of the insert located between its endmost bell mouthed flange and its intermediate flange.

In an advantageous embodiment of the connection according to the invention, in the case where the member to be connected to the main pipe is formed by another main pipe close to and parallel to the first one, itself also flexible, reinforced or not, sheathed or not, the second flange of the insert is a flange which is also bell mouthed and which is provided at the other end of the insert and which is applied against the internal surface of the boss, having a flange which is again bell mouthed, provided on the periphery of the bypass orifice based in the other main pipe.

In another advantageous embodiment of the bypass connection of the invention, in the case where the member to be connected to the main pipe is formed by another main pipe situated close to and parallel to the first one, the junction material, molded about the two main pipes and the insert, has the form of an I, each transverse segment of which completely envelopes the corresponding portion of each main pipe, whereas the longitudinal segment of the I completely envelopes said insert.

In yet another embodiment of the connection of the invention, in the case where the member to be connected to the main pipe is formed by a tapped insert, intended to receive a drain screw more particularly, this member is formed by the secondary core which forms at the same time the insert of the bypass connection, the second flange of this latter being an annular flange for attaching the molded junction material thereto, provided about the other end of the insert.

The present invention also provides a process for manufacturing a bypass connection for flexible pipes, reinforced or not, sheathed or not, of the type comprising the molding of a coating of junction material, such as rubber, around a part at least of a rigid tubular insert included in the bypass connection, and the previous positioning of a rigid core for supporting the main pipe, having a boss with a bell mouthed flange on the periphery of a bypass orifice pierced at the chosen position, as well as a rigid secondary core for supporting a member to be connected to said main pipe, which process is characterized in that the secondary core has an appropriate tubular shape comprising at one end a first bell mouthed flange, intended to be applied against the internal surface of said boss, with a flange which is also bell mouthed, of the main pipe, in combination with a second flange and in that, with the molding of said junction material, being achieved in a known way, only the main core is removed once the molding is finished, whereas the secondary core is left in place as an insert forming an integral part of the molded bypass connection, which second flange is an intermediate annular flange or another end flange with a bell mouthed shape, or else an endmost annular flange, depending on whether said member is a secondary flexible pipe, or another main flexible pipe, or else a tapped insert intended to receive a drain screw, respectively.

In addition to the above arrangements, the invention comprises yet other arrangements which will be clear from the following description.

BRIEF DESCRIPTION OF THE DRAWINGS

The invention will be better understood from the complement of description which follows with reference to the accompanying drawings in which.

It should however be understood that these drawings and the corresponding descriptive parts are given solely by way of illustration of the subject of the invention, of which they form in no wise a limitation.

DESCRIPTION OF THE PREFERRED EMBODIMENTS

The process for manufacturing a bypass connection for flexible pipes, reinforced or not, sheathed or not, in accordance with the invention, presents an indisputable advantage with respect to the processes of the prior art also comprising molding a coating of junction material, such as rubber, and previous positioning of a main rigid core for supporting a main flexible pipe, having a boss with a bell mounthed flange on the periphery of a bypass orifice pierced in this main pipe, as well as a rigid secondary core for supporting a member to be connected to said main pipe; this advantage is formed by eliminating the costly operation which consists, in particular, in removing the secondary core after molding of the junction material: in fact, after molding, only the main core is removed whereas the secondary core is left in place as an insert forming an integral part of the bypass connection and surrounded, at least partially, by said junction material.

Figure 1:
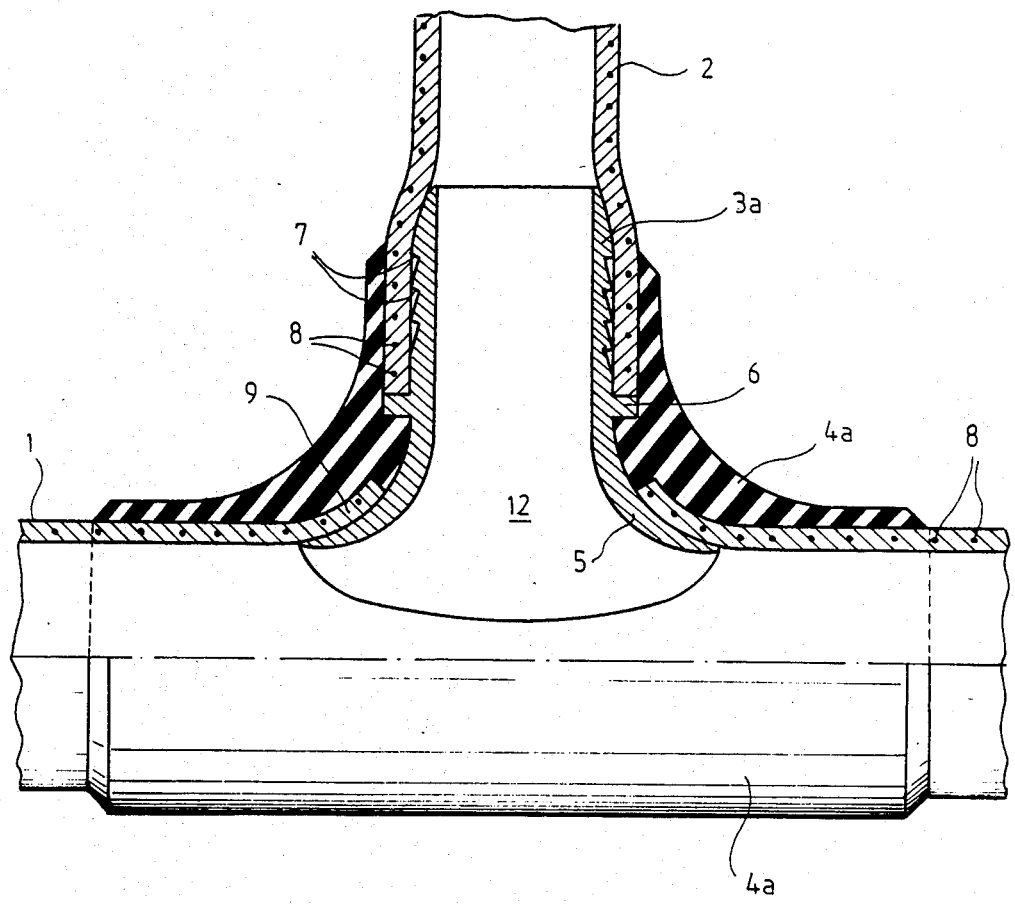
FIG. 1 shows a bypass connection between a main pipe and a secondary flexible pipe, obtained in accordance with a process of the present invention.
Figure 2:
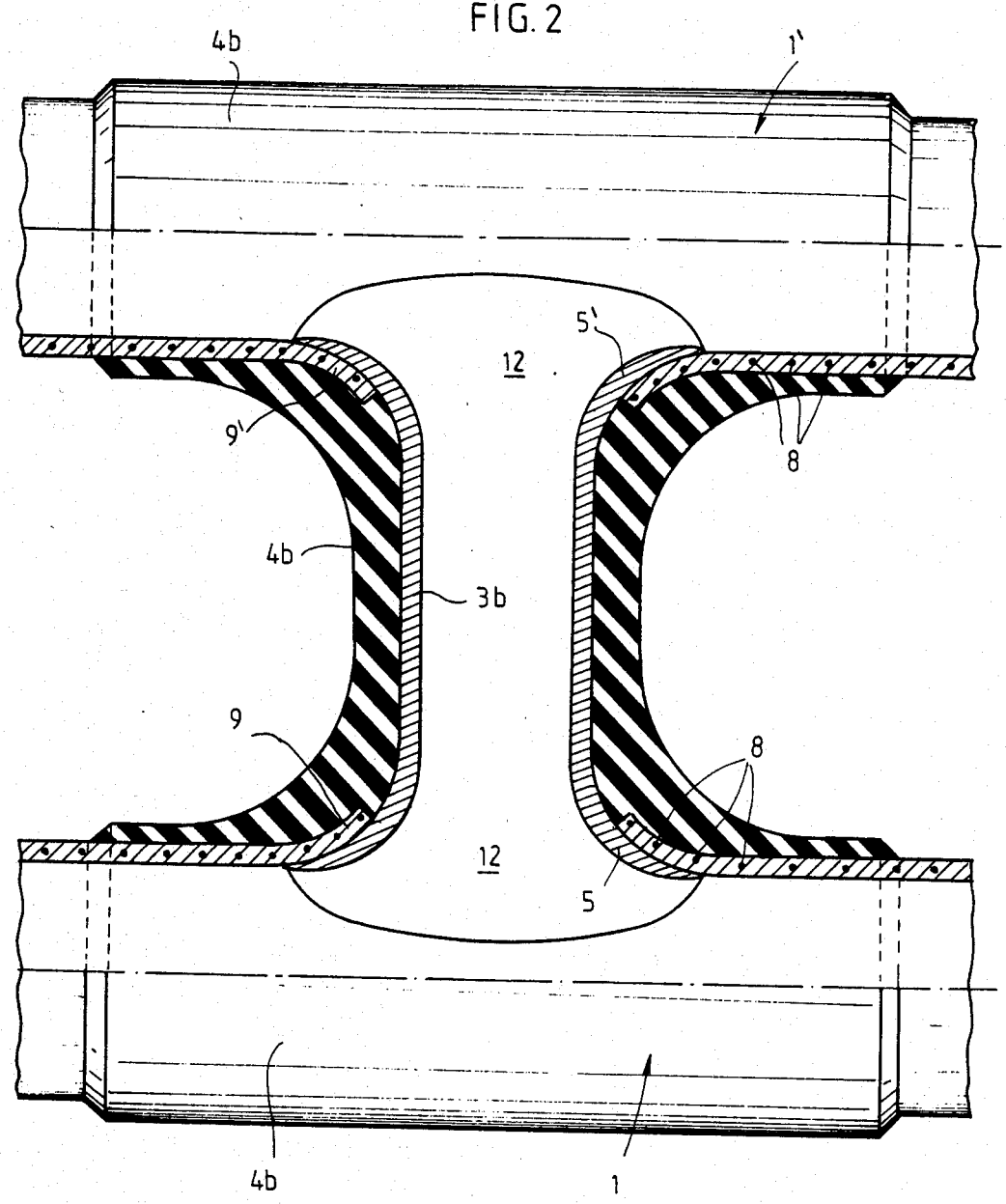
FIG. 2 shows a bypass connection between two main flexible pipes, situated close to and parallel to each other, also obtained in accordance with the invention.
Figure 3:
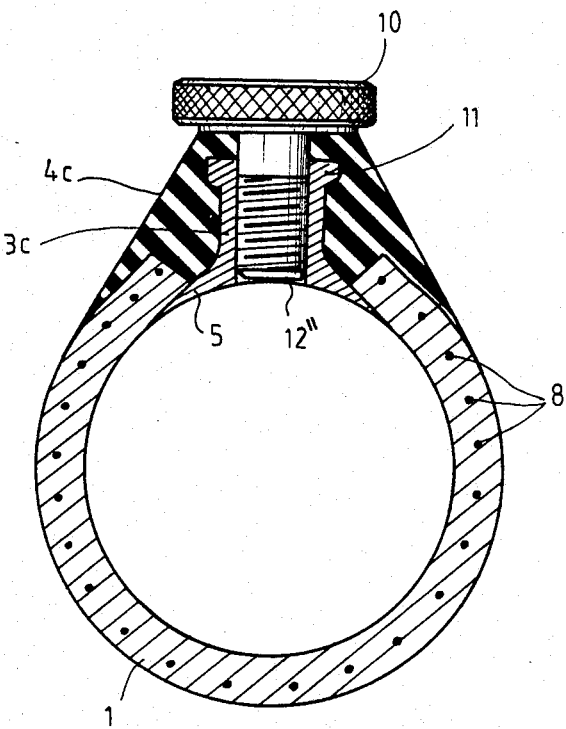
FIG. 3 shows a drain bypass connection also provided in accordance with the process of the invention.

It goes without saying that the advantage of the process is not limited solely to the fact that it is not necessary to remove the secondary core: in fact, the presence of this latter considerably increases the rigidity of the connection, as well as its life span and its tightness, because of an appropriate structure of the secondary core as is stated in the description of the different types of bypass connections for flexible pipes, shown in FIGS. 1 to 3. In particular, the process of the invention makes possible "bridging" between two main flexible pipes situated close to and parallel to each other (cf. FIG. 2), which it was not possible to obtain with the processes of the prior art which cannot be applied in this case for removal of the secondary core is not possible.

FIG. 1 refers to a first bypass connection for flexible pipes, in accordance with the process of the invention, formed between a main flexible pipe 1 and a secondary flexible pipe 2.

The rigid insert 3a supporting secondary pipe 2 is left in place as an embedded rigid core, or as a rigid tubular insert forming an integral part of the bypass connection, once the molding of the coating of junction material 4a is finished.

The rigid insert 3a is provided at the lower end with a bell mouthed flange 5 which gives to the insert 3a the form of a trumpet, and which is applied against the internal surface of a boss 9 having a flange which is also bell mouthed, with which the periphery of the bypass orifice 12 pierced in the main pipe 1 is provided.

This bell mouthed flange 5 holds boss 9 of the main flexible pipe 1 firmly in position while protecting it from becoming unstuck accidentally, which may be detrimental to the tightness of the bypass connection, if the unsticking extends laterally.

Still with reference to FIG. 1, insert 3a is provided with an intermediate annular flange 6 in an intermediate position on its outer surface, so as to allow positioning of the terminal end of the secondary pipe 2.

The upper end of insert 3a, enveloped by the end of the secondary pipe 2, is advantageously provided with notches which prevent this pipe 2 from being accidently pulled off; at the same time the notched end of insert 3a holds the ends of the secondary flexible pipe 2 firmly in position, which end is also protected from any likelihood of becoming unstuck accidentally and from any danger of losing its tightness.

It goes without saying that the protection against accidental unsticking of the boss of the main flexible pipe 1 and of the end of the secondary flexible pipe 2 also involves the protection of reinforcement 8 from any contact with the fluid conveyed.

Said insert 3a cooperates with a finger (not shown) for centering the secondary flexible pipe 2 (which may have a priori any orientation) with respect to the main flexible pipe 1.

The outer shape of the molded junction material coating 4a contributes to reinforcing the bypass connection as a whole and in increasing its useful life: coating 4a shown in FIG. 1 has the form of a T, more especially an inverted T, whose transverse segment completely envelopes the corresponding portion of the main pipe 1, whereas the longitudinal segment of this T completely envelopes the corresponding portion of the secondary pipe 2 as well as the part of insert 3a included between its endmost bell mouthed flange 5 and its intermediate annular flange 6.

FIG. 2 refers to a second bypass connection for flexible pipes formed between two main flexible pipes 1 and 1'.

In this case also the secondary rigid core 3b is left in place as a rigid embedded core or as a rigid tubular insert forming an integral part of the bypass connection, once the molding of the coating of junction material coating 4b is finished, thus increasing the rigidity, the field tightness and the lifespan of this bypass connection: it is furthermore evident that "bridging" is made possible because of the positioning of this rigid core insert 3b.

The secondary core 3b is, in this case, provided at each end with a bell mounthed flange 5 and 5' respectively, with is applied against the internal surface of each of bosses 9 and 9', having a flange which is also bell mouthed, formed on the periphery of the bypass orifices 12 and 12' pierced in the two main flexible pipes 1 and 1', respectively.

The two bell mouthed end flanges 5 and 5' of the insert 3b protect bosses 9 and 9', which are applied thereagainst, from becoming unstuck and thus contribute to the tightness of the connection, preventing any contact between the reinforcement 8 of the two main flexible pipes 1 and 1' and the fluid conveyed.

Insofar as the external shape of the junction material 4b is concerned, it also contributes in this case to the strength of the bypass connection as a whole and to increasing its lifespan: coating 4b shown in FIG. 2 has a form of an I, each transverse segment of which completely envelopes the corresponding portion of each of the main pipes 1 and 1', whereas the longitudinal segment of the I completely envelopes said rigid tubular insert 3b.

A bypass connection such as the one shown in FIG. 2, namely a "bridging" connection, is preferably formed between two closely spaced main flexible pipes, that is to say when the distance which separates them is less than or equal to about 30 mm. In the case of main pipes spaced further apart, they can be connected together by means of a secondary flexible pipe whose ends are joined as shown in FIG. 1.

The bypass connection shown in FIG. 3 refers to a drain bypass connection.

In the prior art, a tapped insert was used in this case for receiving a drain screw, and more particularly was connected to a main flexible pipe by molding a coating of junction material, after having previously positioned the insert and a removable secondary rigid core for supporting this insert, in particular assembled together by screwing more especially, and a main rigid core also removable for supporting the main flexible pipe, said main removable core being assembled also by screwing with the removable secondary core.

The advantage of the process according to the present invention resides in the fact that the tapped insert is formed by the rigid secondary core insert 3c (compare FIG. 3) which is left in place, after molding, as a rigid tubular insert 3c intended to receive a drain screw 10.

This secondary core 3c is provided at its lower end with a bell mouthed flange 5 which is applied against the internal surface of boss 9, provided with a flange which is also bell mouthed, formed on the periphery of the bypass orifice 12" pierced in the main pipe 1, while protecting this boss 9 from becoming accidently unstuck and so the reinforcement 8 of the main pipe 1 against any contact with the fluid conveyed.

Insert 3c is also provided with an annular flange 11 at the other end, for retaining the molded junction material 4c.

As is clear from the foregoing, the invention is in no wise limited to those of its modes of implementation, embodiments and modes of application which have just been described more explicitly; it embraces, on the contrary, all variations thereof which may occur to a man skilled in the matter, without for all that departing from the scope and spirit of the present invention.

What is claimed as new and desired to be secured by Letters Patent of the United States is:

1. A process for manufacturing a bypass connection including first and second flexible pipes having first and second boss members respectively formed by first and second openings formed in radial sidwalls of said pipes, wherein the process comprises:
   interconnecting said first and second openings with a rigid core bypass member having flared ends, by engaging an inner surface of the bosses of said first and second flexible pipes with a corresponding exterior surface of the flared ends of said rigid core member, and
   forming a fluid tight material coating on the entire exterior surface of said rigid core member, except an exterior surface portion of its flared ends engaging the inner surfaces of the bosses, and on all of the exterior surface portions of the flexible pipes adjacent to said rigid core member, in order to integrally connect said first and second flexible pipes.

2. A process as set forth in claim 1, wherein said step of forming a fluid tight material coating further comprises forming a material coating which is substantially I-shaped.

3. A process as set forth in claim 1, wherein said step of forming a fluid tight material coating further comprises forming a material coating which is substantially H-shaped.

4. A bypass connection including first and second flexible pipes having first and second boss members respectively having outwardly flared flanges formed by first and second openings formed in radial sidewalls of said pipes, comprising:
   a rigid tubular insert having an axial, annular bore formed through said insert, which comprises at one end a first radially flared flange positioned against an internal surface of said boss of said first flexible pipe and at a second end of said rigid tubular insert a second radially flared flange positioned against an internal surface of said boss of said second flexible pipe, and
   a fluid tight material coating of appropriate thickness molded on the entire exterior surface of said rigid tubular insert, except an exterior surface portion of its flared ends engaging the inner surfaces of the bosses, and on all exterior surface portions of the flexible pipes adjacent to said rigid tubular insert, in order to integrally connect said first and second flexible pipes.

5. The bypass connection as claimed in claim 4, wherein said first flexible pipe is located adjacent to and parallel to said second flexible pipe.

6. The bypass connection as claimed in claim 4, wherein said fluid tight material coating is substantially I-shaped.

7. The bypass connection as claimed in claim 4, wherein said fluid tight material coating is substantially H-shaped.

* * * * *